United States Patent
Samie et al.

(10) Patent No.: US 10,514,096 B2
(45) Date of Patent: Dec. 24, 2019

(54) CONTINUOUSLY VARIABLE TRANSMISSION RATIO MEASURING DEVICE

(71) Applicant: GM Global Technology Operations LLC, Detroit, MI (US)

(72) Inventors: Farzad Samie, Franklin, MI (US); Chunhao J. Lee, Troy, MI (US); Derek F. Lahr, Howell, MI (US); Dmitriy Bruder, Auburn Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 287 days.

(21) Appl. No.: 15/727,141

(22) Filed: Oct. 6, 2017

(65) Prior Publication Data
US 2019/0107195 A1   Apr. 11, 2019

(51) Int. Cl.
*F16H 61/662* (2006.01)
*F16H 9/12* (2006.01)

(52) U.S. Cl.
CPC ......... *F16H 61/66263* (2013.01); *F16H 9/12* (2013.01); *F16H 2061/66277* (2013.01)

(58) Field of Classification Search
CPC ................ F16H 61/662–2061/66295
See application file for complete search history.

(56) References Cited

U.S. PATENT DOCUMENTS 6,099,424 A * 8/2000 Tsai ............... F16H 61/662
474/12

\* cited by examiner

*Primary Examiner* — Erin D Bishop
(74) *Attorney, Agent, or Firm* — Quinn IP Law

(57) ABSTRACT

The continuously variable transmission (CVT) assembly includes a CVT including a drive pulley, a driven pulley, and an endless rotatable device coupled between the drive pulley and the driven pulley. The CVT assembly also includes an actuator coupled to the drive pulley. The CVT assembly also includes an angle sensor coupled to the endless rotatable device such that the angle sensor is configured to measure an angular position of the endless rotatable device. The CVT assembly also includes a controller in communication with the actuator and the angle sensor. The controller is programmed to: (a) determine a speed ratio of the CVT based on the angular position of the endless rotatable device; and (b) control the actuator to adjust the clamping force exerted on the drive pulley in response to determining the speed ratio of the CVT.

20 Claims, 5 Drawing Sheets

CONTINUOUSLY VARIABLE TRANSMISSION RATIO MEASURING DEVICE

INTRODUCTION

The present disclosure relates to a continuously variable transmission (CVT) ratio measuring device.

A CVT is a power transmission providing infinite variability of speed ratios within a calibrated range. That is, a CVT instead uses a variator assembly with a pair of variable-diameter pulleys to transition anywhere within the calibrated range of speed ratios.

SUMMARY

The present disclosure describes a continuously variable transmission (CVT) assembly that measures CVT speed ratio based on the geometrical configuration and compares such measured CVT ratio with a speed ratio calculation derived from input speed and the output speed of the CVT assembly to determine if the CVT assembly is slipping. If the CVT assembly is slipping, the clamping force of the CVT is increased to maximize the life of the CVT. As a result, the pump and bearing losses are minimized, fuel economy is maximized, and the life of the CVT assembly is maximized.

In certain embodiment, the CVT assembly includes a CVT including a drive pulley, a driven pulley, and an endless rotatable device coupled between the drive pulley and the driven pulley. The CVT assembly also includes an actuator coupled to the drive pulley. As such, the actuator is configured to exert a clamping force on the drive pulley. The CVT assembly also includes an angle sensor coupled to the endless rotatable device such that the angle sensor is configured to measure an angular position of the endless rotatable device. The CVT assembly also includes a controller in communication with the actuator and the angle sensor. The controller is programmed to: (a) determine a first speed ratio of the CVT based on the angular position of the endless rotatable device; and (b) control the actuator to adjust the clamping force exerted on the drive pulley in response to determining the first speed ratio of the CVT. The CVT assembly further includes a first speed sensor coupled to the drive pulley. As such, the first speed sensor is configured to measure an input speed of the CVT. The CVT assembly further includes a second speed sensor coupled to the driven pulley. As such, the second speed sensor is configured to measure an output speed of the CVT. The controller is programmed to calculate a second speed ratio of the CVT as a function of the input speed of the CVT and the output speed of the CVT. The controller is programmed to determine that the difference between the first speed ratio and the second speed ratio is greater than a predetermined ratio threshold. The controller is programmed to command the actuator to increase the clamping force exerted on the drive pulley in response to determining that the difference between the first speed ratio and the second speed ratio is greater than the predetermined ratio threshold. The angular position of the endless rotatable device is expressed as a device angle from a central axis of the CVT to a longitudinal center axis of the endless rotatable device. The central axis of the CVT intersects an axis of rotation of the driven pulley and an axis of rotation of the drive pulley. The longitudinal center axis extends along a connecting segment of the endless rotatable device that is solely disposed between the driven pulley and the drive pulley such that no portion of the connecting segment is in direct contact with the driven pulley and the drive pulley. The CVT assembly further includes a CVT case and a guide pivotally coupled to the CVT case. The guide is directly coupled to the endless rotatable device. As such, the guide directs the movement of the endless rotatable device. The angle sensor may be directly coupled to the guide.

The angular position of the endless rotatable device is expressed as a device angle from a central axis of the CVT to a longitudinal center axis of the endless rotatable device. The central axis of the CVT intersects an axis of rotation of the driven pulley and an axis of rotation of the drive pulley. The longitudinal center axis extends along a connecting segment of the endless rotatable device that is solely disposed between the driven pulley and the drive pulley such that no portion of the connecting segment is in direct contact with the driven pulley and the drive pulley. The controller is programmed to determine the first speed ratio of the CVT as a function of the device angle, a primary radii and a secondary radii, the primary radii is a distance from the axis of rotation of the driven pulley to a location in which the endless rotatable device is in direct contact with the driven pulley, the secondary radii is a distance from the axis of rotation of the drive pulley to a location in which the endless rotatable device is in direct contact with the drive pulley.

The endless rotatable device may be a chain, the CVT assembly further includes a first speed sensor coupled to the drive pulley such that the first speed sensor is configured to measure an input speed of the CVT. The CVT assembly further includes a second speed sensor coupled to the driven pulley such that the second speed sensor is configured to measure an output speed of the CVT. The controller is programmed to calculate a second speed ratio of the CVT by dividing the output speed of the CVT by the input speed of the CVT. The controller is programmed to subtract the second speed ratio from the first speed ratio to determine a difference between the first speed ratio and the second speed ratio. The controller is programmed to determine that the difference between the first speed ratio and the second speed ratio is greater than a predetermined ratio threshold. The controller is programmed to command the actuator to increase the clamping force exerted on the drive pulley in response to determining that the difference between the first speed ratio and the second speed ratio is greater than the predetermined ratio threshold.

The CVT assembly further includes a CVT case and a guide pivotally coupled to the CVT case. The guide is directly coupled to the endless rotatable device. As such, the guide directs the movement of the endless rotatable device. The angle sensor may be directly coupled to the guide. The CVT assembly further includes a pivot pin directly interconnecting the CVT case and the guide. The guide includes a first guide portion and a second guide portion. The first guide portion is spaced apart from the second guide portion so as to define a guiding gap therebetween. The guiding gap movably receives the endless rotatable device. The guide further includes a guide coupling portion interconnecting the first guide portion and the second guide portion. The guide defines a guiding slot in the guide coupling portion. The guiding slot movably receives the pivot pin to facilitate axial and pivotal movement of the guide relative to the CVT case.

The present disclosure also relates to a vehicle including a power plant configured to generate input torque. In addition, the vehicle includes a CVT as described above. The drive pulley of the CVT is configured to receive the input torque from the power plant.

The present disclosure also describes a method for controlling the CVT. The method includes the following steps: (a) determining a first speed ratio based on an angular position of an endless rotatable device of the CVT; (b) determining a second speed ratio based on an input speed and an output speed of the CVT; (c) determining a difference between the first speed ratio and the second speed ratio; and (d) determining that the difference between the first speed ratio and the second speed ratio is greater than a predetermined ratio threshold; and (e) controlling, by a controller, an actuator of the CVT to adjust a clamping force exerted on a drive pulley in response to determining the difference between the first speed ratio and the second speed ratio is greater than the predetermined ratio threshold.

The above features and advantages and other features and advantages of the present disclosure are readily apparent from the following detailed description when taken in connection with the accompanying drawings.

DETAILED DESCRIPTION

Figure 1:
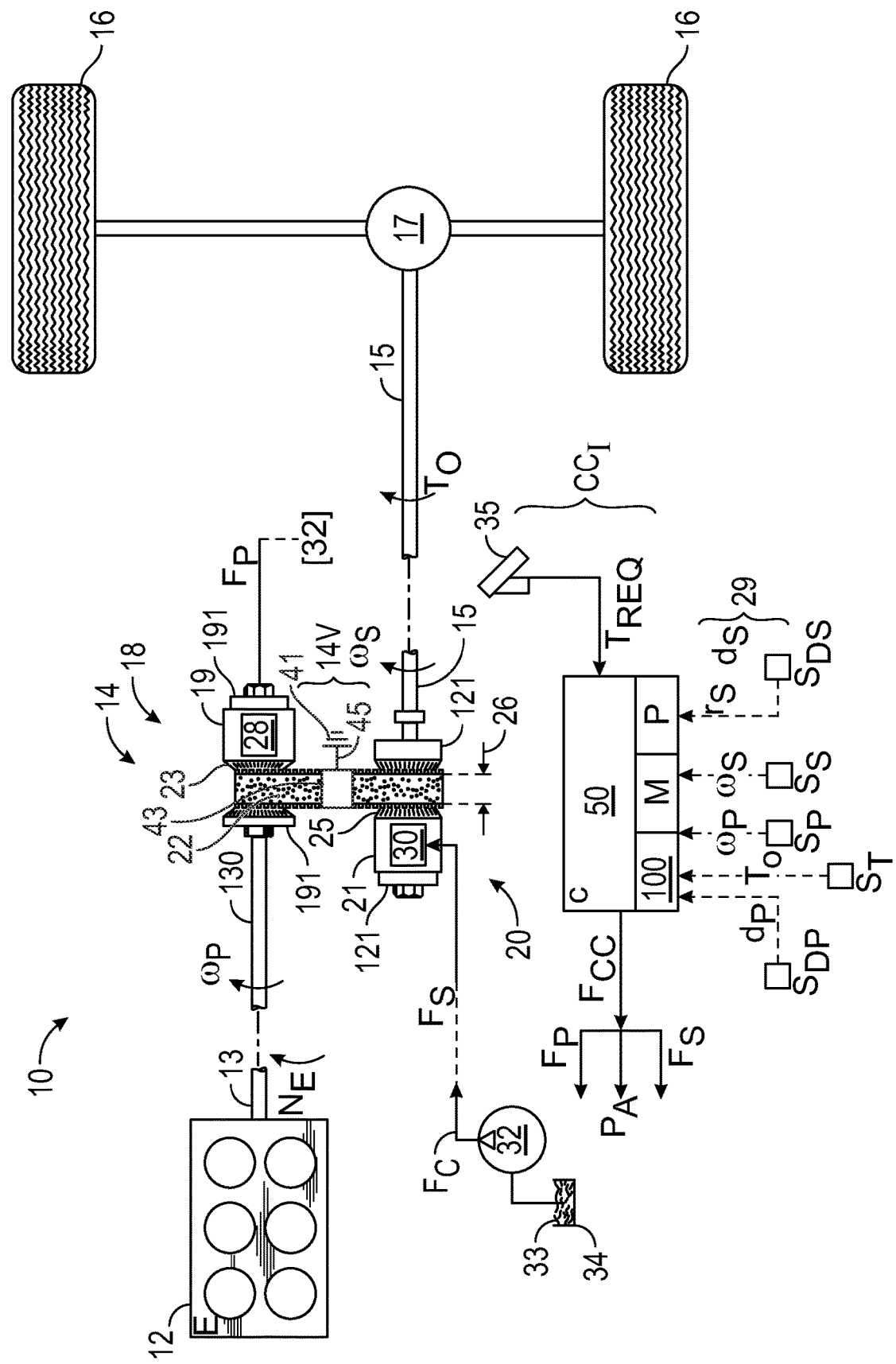
FIG. 1 is a schematic illustration of an example vehicle having an internal combustion engine and a fixed gear/positive engagement continuously variable transmission (CVT) controlled as set forth herein.

Referring to the drawings, wherein like reference numbers correspond to like or similar components throughout the several figures, an example vehicle 10 is shown schematically in FIG. 1. The vehicle 10 includes a power plant, which is shown as an example internal combustion engine (E) but which may be alternatively embodied as an electric machine or other suitable torque generating device. For illustrative consistency, the power plant is described in this disclosure as being an engine 12 without being limited to such a design.

Figure 2:
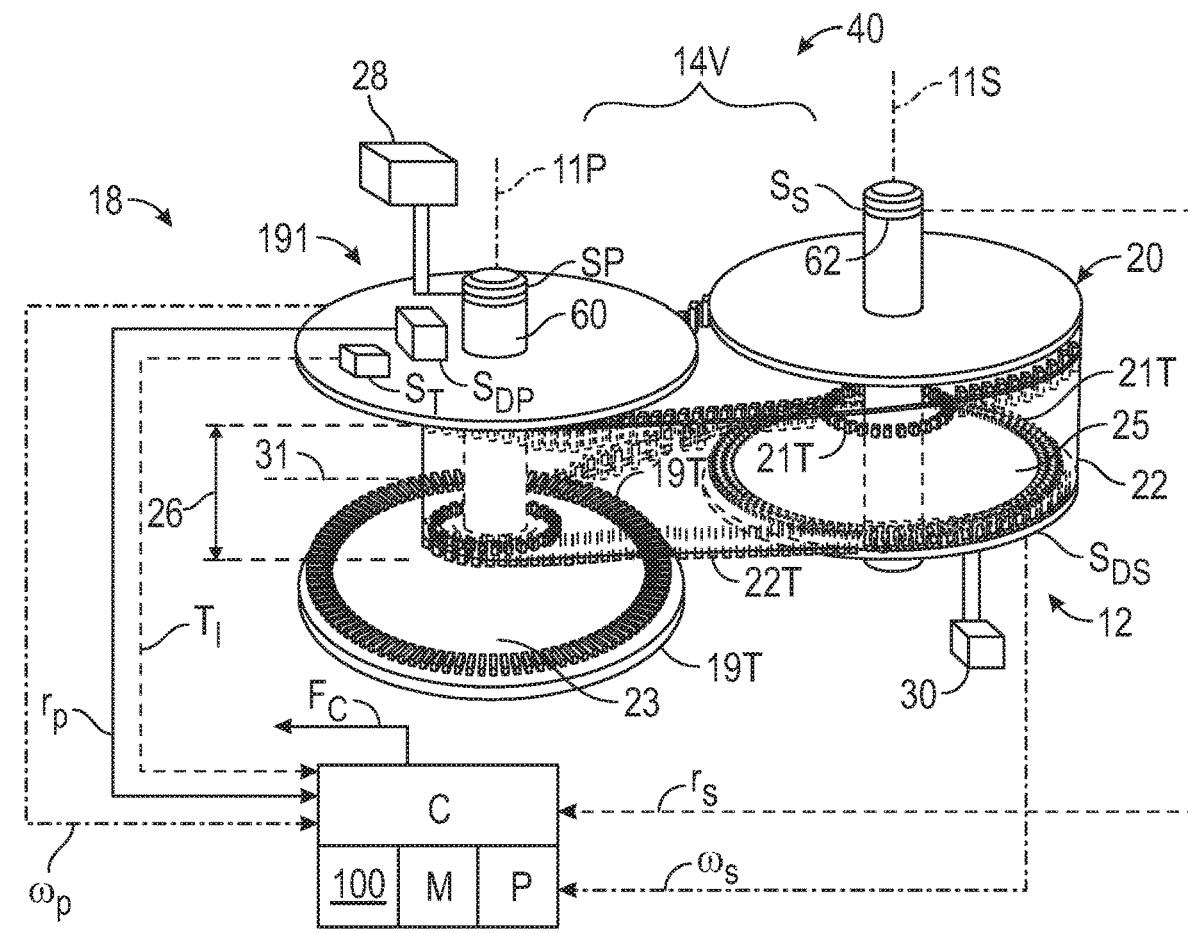
FIG. 2 is a schematic illustration of an example fixed gear/positive engagement CVT usable as part of the vehicle shown in FIG. 1 and controllable via the method of FIG. 8.

With reference to FIGS. 1 and 2, the vehicle 10 of FIG. 1 includes a fixed gear/positive engagement continuously variable transmission (CVT) 14 and an associated controller (C) 50. As set forth below in further detail with reference to FIGS. 2 and 5, the controller 50 is configured (i.e., programmed in software via computer-readable and implementable instructions embodying a method 100 and sufficiently equipped in hardware) to control a mode transition between the two possible torque transfer modes of the CVT 14 (i.e., a friction drive mode and a fixed gear/positive engagement drive mode).

In the CVT 14, the friction drive mode provides infinite variability of speed ratios between a lowest and highest possible speed ratio. Such infinite variability continues up until positive engagement is achieved, whereupon a fixed gear ratio is sustained until control conditions warrant a change back to the friction drive mode. The enhancement of the CVT 14 with positive engagement functionality can increase variator efficiency due to a reduced reliance on the hydraulic and/or electromechanical clamping forces ordinarily needed to maintain the friction drive mode.

The engine 12 includes a crankshaft 13 configured to rotate at an engine speed ($N_E$). The crankshaft 13 is connected to an input member 130 (e.g., input shaft) of the CVT 14, either directly or indirectly (e.g., via a torque converter or an input/disconnect clutch) depending on the design. The CVT 14 also includes an output member 15 (e.g., output shaft). The output member 15 ultimately delivers transmission output torque ($T_O$) to a set of drive wheels 16 of the vehicle 10 via, by way of example, a final drive or a differential 17.

The CVT 14 includes a variator assembly 14V having a drive/primary pulley 18 and a driven/secondary pulley 20. The primary pulley 18 is connected to and driven by the input member 130 of the CVT 14. The secondary pulley 20 is connected to and drives an output member 15 of the CVT 14. The CVT 14 also includes an endless rotatable device 22, such as a belt or chain. As used herein, the term "endless rotatable device" refers generally to closed/endless rotatable drive elements or closed-loop of a rubber and/or metal material suitable for transmitting torque from the primary pulley 18 to the secondary pulley 20 within the variator assembly 14V, including a chain or a conventional rubber and metal drive belt. In other words, the term "endless rotatable device" is inclusive of endless rotatable drive elements of the type usable for transferring torque between pulleys in a CVT such as the CVT 14 of FIG. 1. The CVT 14 is enclosed in a CVT case 41. A guide 43 is pivotally coupled to the CVT case 41 and may be directly coupled to the endless rotatable device 22. As such, the guide 43 guides the movement of the endless rotatable device 22. A pivot pin 45 pivotally couples the guide 43 to the CVT case 41.

Figure 3:
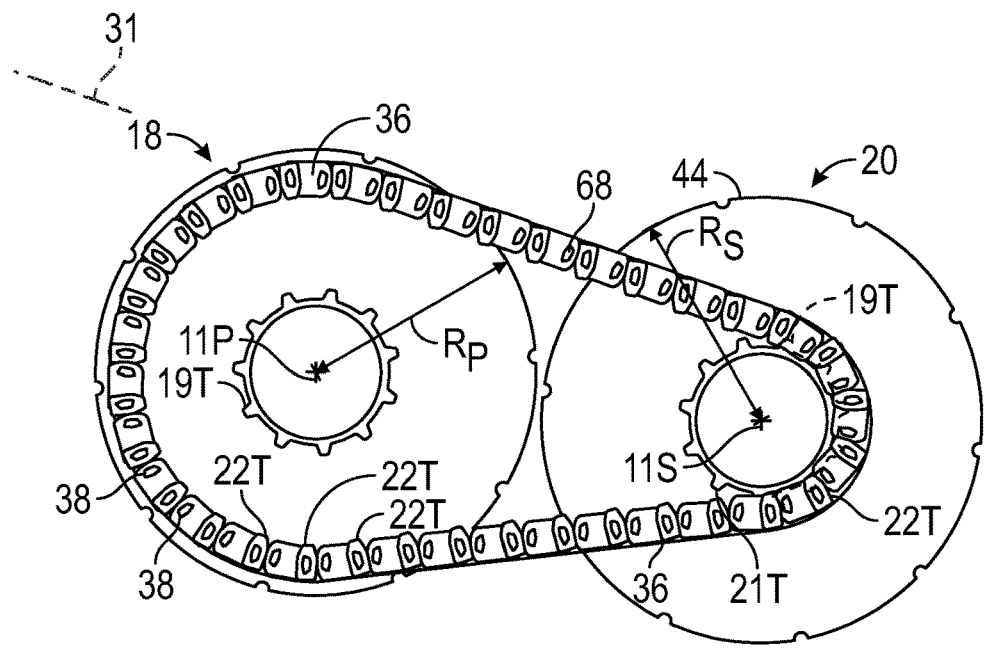
FIG. 3 is a schematic, front view of the CVT shown in FIG. 2.
Figure 4:
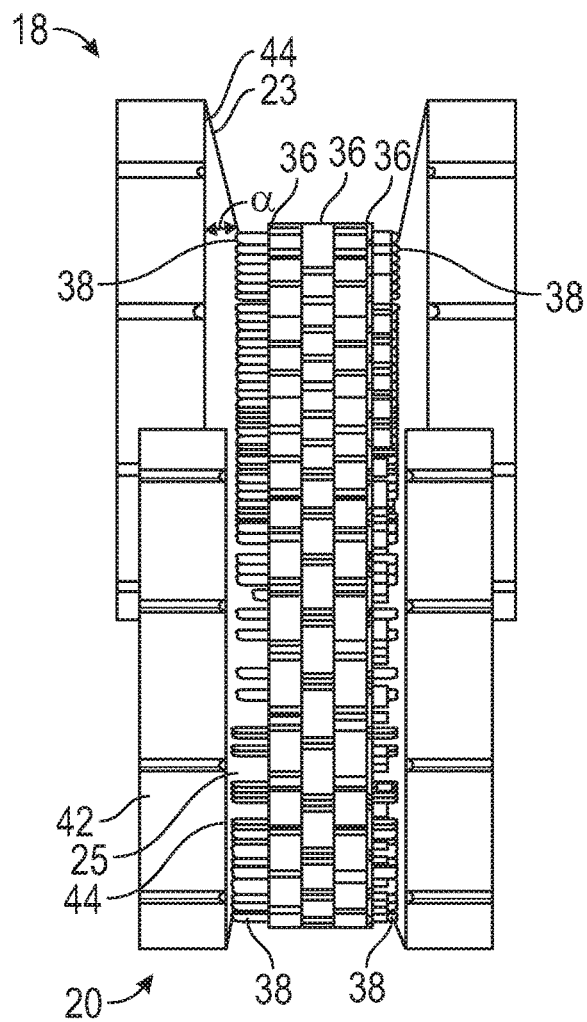
FIG. 4 is a schematic, side view of the CVT shown in FIG. 2.

With reference to FIGS. 3 and 4, the endless rotatable device 22 includes a plurality of interspaced device teeth 22T (see FIG. 2) which are used to achieve positive engagement in fixed gear modes of the CVT 14. In addition to the device teeth 22T, the endless rotatable device 22 may include a plurality of links 36, such as chain links, arranged in rows. A plurality of connecting pins 38 interconnects the links 36 to one another. At least some of the connecting pins 38 also couple the device teeth 22T to the links 36. When the CVT 14 operates in the friction drive mode, the connecting pins 38 are in direct contact with the primary pulley 18 and the secondary pulley 20.

With reference again to FIGS. 1-4, the respective primary and secondary pulleys 18 and 20 each have a pair of pulley sheaves 19 and 21, respectively, each with a respective frustoconical sheave face 23 or 25 defining a variable-width sheave gap 26. The endless rotatable device 22 of the CVT 14 is positioned within the sheave gap 26 and contacts the sheave faces 23 and 25. In the depicted embodiment, the connecting pins 38 (FIG. 4) of the endless rotatable device 22 directly contact the sheave faces 23 and 25 at least when the CVT 14 is operating in the friction drive mode. In the depicted embodiment, engine speed ($N_E$) acts as an input speed ($\omega_P$) to the primary pulley 18. In other embodiments, another value other than the engine speed ($N_E$) may serve as the input speed ($\omega_P$) (e.g., turbine speed when a torque converter is used downstream of the engine 12, rotor speed, etc.). The secondary pulley 20 rotates at a secondary speed ($\omega_S$).

The width of the sheave gap 26 may be varied via a movement of a moveable one of the pulley sheaves 19 and/or 21 of each the respective primary and secondary pulleys 18 and 20 to change the speed ratio of the CVT 14. To that end, the vehicle 10 includes respective first and second pulley actuators 28 and 30 responsive to respective primary and secondary force commands ($F_P$, $F_S$ respectively) to compress the respective primary and secondary pulleys 18 and 20, i.e., to move the pulley sheaves 19 toward each other and/or to move the pulley sheaves 21 toward each other depending on whether the width of the sheave gap 26 on the drive or driven side of the variator assembly 14V is being modified. An example embodiment of the first and second actuators 28 and 30 includes a hydraulic piston/cylinder system, although electromechanical, pneumatic, or other linear actuators may be used in the alternative within the intended inventive scope.

Each of the pulley sheaves 19, 21 includes a lateral circumferential wall 42 and a circumferential edge 44 between each lateral circumferential wall 42 and the respective sheave face 23, 25. Each of the pulley sheaves 19, 21 defines a sheave angle $\alpha$, which is an oblique angle defined between the respective sheave faces 23, 25 and the respective circumferential edge 44. The drive pulley 18 also has a radius $R_P$, and the driven pulley 20 has a radius $R_S$. The radius $R_P$ of the drive pulley 18 is a distance from the axis of rotation 11P to the circumferential edge 44 of the drive pulley 18. The radius $R_S$ of the driven pulley 20 is a distance from the axis of rotation 11S to the circumferential edge 44 of the driven pulley 20.

For each of the pulley sheaves 19 and 21, one of the pulley sheaves 19 and 21 is a moveable sheave, in this instance the pulley sheaves 191 and 121. The clamping force ($F_C$), i.e., arrows $F_P$ and/or $F_S$ depending on which of the pulley sheaves 121 and 191 is being moved, may be provided to the CVT 14 via a fluid pump 32 feeding both the primary and secondary forces ($F_P$ and $F_S$) as shown, with the fluid pump 32 drawing a suitable fluid 33 such as oil from a sump 34 and circulating the fluid 33 to the CVT 14 via hoses, fittings, and other suitable fluid conduit.

Each pulley sheave 19 and 21 of FIG. 1 is characterized by a substantially frusto-conical shape, i.e., a cone having its tip or narrow end removed. Each pulley sheave 19 and 21 may include a respective plurality of pulley teeth 19T and 21T on its sheave faces 23, 25, as best shown in FIG. 2 and described in more detail below. In other words, the pulley teeth 19T and 21T are optional. The device teeth 22T, when fully mated with pulley teeth 19T and/or 21T in this embodiment, ensure that rotation of the respective primary or secondary pulleys 18 or 20 causes a rotation of the endless rotatable device to occur and vice versa.

During operation of the CVT 14, the engine 12 transmits input torque to the primary pulley 18. This causes the primary pulley 18 to rotate. As the primary pulley 18 rotates, the sheave face 23 contacts the endless rotatable device 22. For example, the connecting pins 38 of the endless rotatable device 22 contact the sheave face 23. Friction at an interface between the sheave face 23 and the endless rotatable device 22 causes the endless rotatable device 22 to rotate. Because the endless rotatable device 22 is rotationally coupled to the secondary pulley 20, rotation of the endless rotatable device 22 in turn causes the secondary pulley 20 to rotate. While the endless rotatable device 22 rotates, the actuators 28 and/or 30 may apply force to the pulley sheaves 191 and/or 121 of the primary and secondary pulley 18 and 20, respectively, in order to vary the speed ratio of the CVT 14. Such control decisions may be made by the controller 50.

The controller 50 used to control the operation of the CVT 14 may be configured as one or more computer devices having memory (M). The controller 50 is in communication with a plurality of sensors 29 and can command a shift or transition between the friction drive mode and the fixed gear/positive engagement drive mode of the CVT 14, via transmission of the positive engagement control signals ($P_A$) to the CVT 14, i.e., the actuators 28 and/or 30 or another actuator depending on the design.

The controller 50 may include hardware elements such as a processor (P), circuitry including but not limited to a timer, oscillator, analog-to-digital (A/D) circuitry, digital-to-analog (D/A) circuitry, a digital signal processor, and any necessary input/output (I/O) devices and other signal conditioning and/or buffer circuitry. The memory (M) may include tangible, non-transitory memory such as read only memory (ROM), e.g., magnetic, solid-state/flash, and/or optical memory, as well as sufficient amounts of random access memory (RAM), electrically-erasable programmable read-only memory (EEPROM), and the like. The method 100 may be recorded in memory (M) and executed by the processor (P) in the overall control of the vehicle 10.

The controller 50, which is in communication with the first and second actuators 28 and 30, receives a set of control inputs ($CC_I$) from the plurality of sensors 29 as part of the method 100. The sensors 29 are collectively operable for continuously or periodically measuring the input speed ($\omega_P$) of the CVT 14, the output speed ($\omega_S$) of the CVT 14, the axial linear displacements ($d_P$, $d_S$) of each of the drive and driven pulleys 18 and 20, and an input torque $T_I$ of the CVT 14. Therefore, the sensors 29 may include first and second speed sensors $S_P$ and $S_S$, first and second displacement sensors $S_{DP}$ and $S_{DS}$, and a torque sensor $S_T$. The first or primary speed sensor $S_P$ may be connected to a pulley axle 60 (FIG. 2) of the drive pulley 18. The second or secondary speed sensor $S_S$ may be connected to a pulley axle 62 of the driven pulley 20 (FIG. 2). In this embodiment, the speed sensors $S_P$ and $S_S$ directly measure the respective input speed ($\omega_P$) and output or secondary speed ($\omega_S$). The torque sensor $S_T$ may be coupled to the input member 130 of the CVT 14 or the drive pulley 18 of the CVT 14. The input speed ($\omega_P$) and the input torque $T_I$ to the CVT 14 may be measured by the speed sensor $S_P$, or it may be reported or calculated as a function of engine speed ($N_E$), e.g., from an engine control unit. The rotational output speed ($\omega_S$) of the secondary pulley 20 may be likewise measured by the speed sensor $S_S$. The displacement sensors $S_{DP}$ and $S_{DS}$ respectively measure the axial linear displacements ($d_P$, $d_S$) of a respective one of the moveable pulley sheaves 191 and 121. The input torque $T_I$ of the drive pulley 18 can be measured by the torque sensor $S_T$, or determined (e.g., calculated) by the controller 50 based, at least in part, on the input speed ($\omega_P$) of the CVT 14. The input torque $T_I$ of the CVT 14 includes an input torque magnitude $T_{IM}$ and a torque request direction $T_{RD}$. The controller 50 can determine the input torque magnitude $T_{IM}$ and the torque request direction $T_{RD}$ based on an input from the torque sensor $S_T$. Alternatively, the controller 50 can determine the input torque magnitude $T_{IM}$ and the torque request direction $T_{RD}$ based, at least in part, on an input from the speed sensors $S_P$ and/or the actions of the vehicle operator via, for example, the operator actuator 35 (e.g., an accelerator pedal).

The controller 50 can then calculate primary and secondary radii $r_P$ and $r_S$ of the belt positions on the pulleys 18 and 20 respectively, using the geometric design information of the CVT 14 such as its half angle and initial state conditions. That is, the controller 50 is aware of the primary and secondary radii $r_P$ and $r_S$, which may be stored in its memory M and used as needed in the execution of method 100.

As part of its overall shift control functions, the controller 50 may also receive or determine an output torque request ($T_{REQ}$). The output torque request ($T_{REQ}$) is largely determined by the actions of an operator (e.g., driver) of the vehicle 10, for instance via a throttle request, braking levels, present gear state, and the like. To this end, the vehicle 10 includes an operator actuator 35, such as an accelerator pedal, configured to receive inputs from the driver. In the depicted embodiment, the operator actuator 35 can represent the accelerator pedal, the brake pedal, a combination thereof, or other suitable actuator capable of communicating the output torque request $T_{REQ}$ to the controller 50. Accordingly, the controller 50 is in communication (e.g., electronic communication) with the operator actuator 35 and can determine the need for a speed ratio change of the CVT 14 in response to the collective control inputs ($CC_I$) and commands a required clamping force (arrow $F_C$) via transmission of actuator control signals (arrow $F_{CC}$) to achieve the desired ratio change at a calibrated rate.

As part of this strategy, the controller 50 ultimately adjusts the primary and/or secondary forces ($F_P$ and $F_S$) to the actuators 28 and 30 to control a transition between friction drive and positive engagement drive as explained below with reference to FIG. 5. In some embodiments, the actuator control signals ($F_{CC}$) may include a separate positive engagement control signal ($P_A$), for instance when the endless rotatable device 22 or another portion of the CVT 14 is equipped with moveable or deployable teeth or other mechanisms that are commanded on so as to positively engage the CVT 14 and thus enter a fixed gear mode.

A CVT assembly 40 including the CVT 14 and controller 50 of FIG. 1 are shown in more detail in FIG. 2. In this particular non-limiting example embodiment, the CVT 14 provides fixed gear/positive engagement functionality via direct engagement of its device teeth 22T with the pulley teeth 19T and 21T of the respective pulley sheaves 19 and 21. The device teeth 22T selectively engage (e.g., mate with) the pulley teeth 19T and/or 21T at or near the limits of motion of the sheaves 19I and 12I to thereby achieve a fixed gear ratio.

The pulley teeth 19T and 21T are annularly arranged on the respective sheave faces 23 and 25, for instance circumscribing an axis of rotation 11P, 11S of respective pulley shafts 60 and 62 of the primary and secondary pulleys 18 and 20. Positive engagement occurs between the pulley teeth 19T or 21T and the device teeth 22T when the rotating endless rotatable device 22 is brought into proximity with the pulley teeth 19T or 21T during a movement of the moveable pulley sheaves 19I and/or 12I, such that the device teeth 22T ultimately contact and then engage the pulley teeth 19T and/or 21T. This positive engagement establishes a fixed gear mode.

The endless rotatable device 22 has a longitudinal center axis 31 as shown. The device teeth 22T may be arranged orthogonally with respect to the longitudinal center axis 31 of the endless rotatable device 22 to extend radially from a lateral edge of the endless rotatable device 22 toward the pulley teeth 19T, 21T. Although omitted from FIG. 2 for illustrative clarity, similar teeth could be provided on the pulley axles 60 and 62, and/or some teeth may be selectively moveable in response to the positive engagement control signals ($P_A$) of FIG. 1.

With respect to the example CVT 14 shown in FIGS. 1 and 2, during some speed ratios the pulley teeth 19T and 21T do not engage with the device teeth 22T. When not positively engaged, the speed ratios are infinitely variable, with torque transmitted solely via friction between the endless rotatable device 22 and the primary and secondary pulleys 18 and 20. As the device teeth 22T come into direct contact with the pulley teeth 19T or 21T, the controller 50 can control the clamping force $F_C$ exerted by the actuators 28 and/or 30 on the drive pulley 18 and/or the driven pulley 20 based, at least in part, on various signals from the sensors 29 (FIG. 1).

Figure 5:
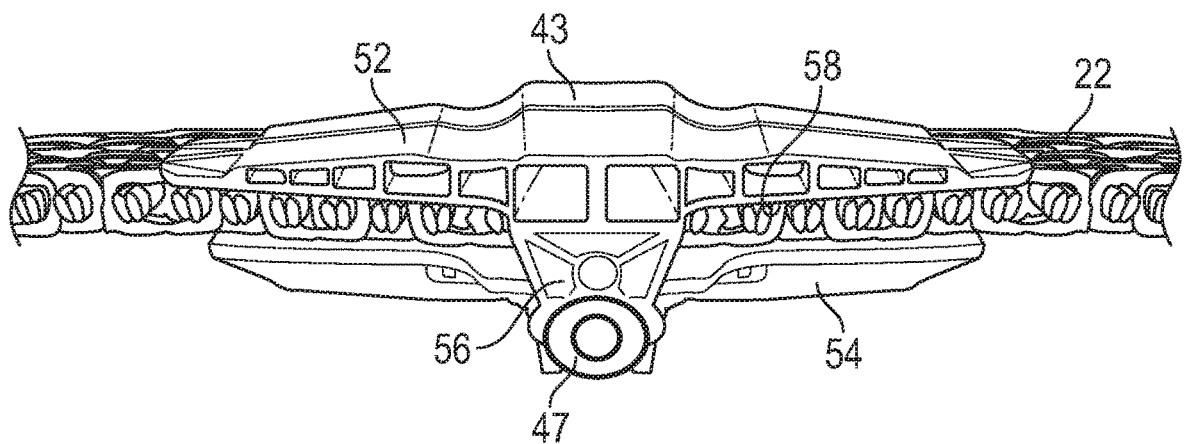
FIG. 5 is a schematic, enlarged front view of a guide, an endless rotatable device, and a rotary angle sensor coupled to the guide.
Figure 6:
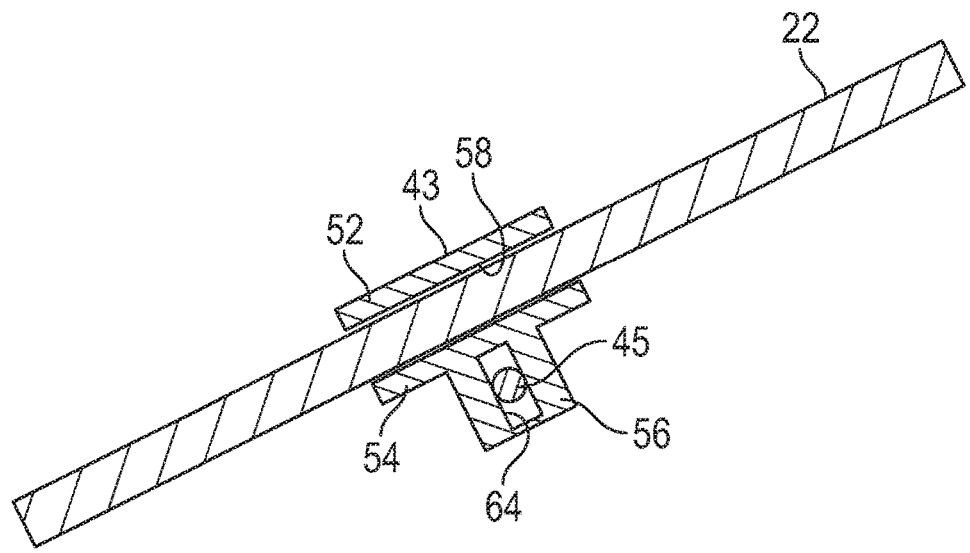
FIG. 6 is a schematic, sectional view of the guide coupled to the endless rotatable device.

With reference to FIGS. 5 and 6, the guide 43 is pivotally coupled to the CVT case 41. The guide 43 may be directly coupled to the endless rotatable device 22 to guide the movement of the endless rotatable device 22. A rotary angle sensor 47, such as a rotary encoder, may be directly coupled to the guide 43 to determine the angular position of the endless rotatable device 22 relative to the primary and secondary pulleys 18 and 20. The pivot pin 45 (or other suitable pivot point as shown in FIG. 6) directly interconnecting the CVT case 41 (FIG. 1) and the guide 43. The guide 43 includes a first guide portion 52, a second guide portion 54, and a guide coupling portion 56 directly interconnecting the first guide portion 52 and the second guide portion 54. The first guide portion 52 is spaced apart from the second guide portion 54 so as to define a guiding gap 58 therebetween. The guiding gap 58 movably receives the endless rotatable device 22 to guide the movement of the endless rotatable device 22. The guide 43 defines a guiding slot 64 in the guide coupling portion 56. The guiding slot 64 receives the pivot pin 45 to facilitate axial and pivotal movement of the guide 43 relative to the CVT case 41.

Figure 7:
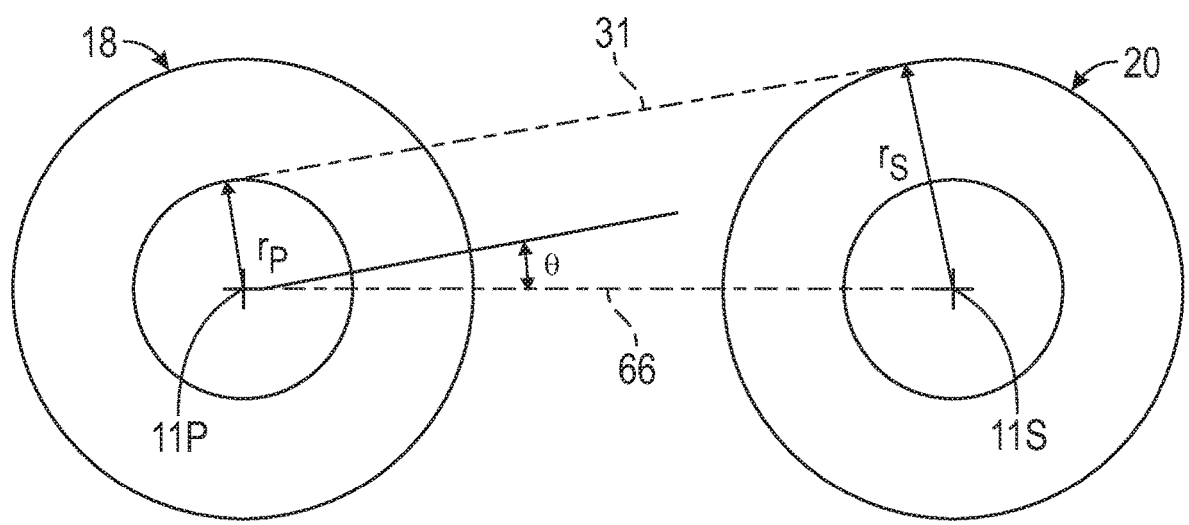
FIG. 7 is a schematic illustration of the guide and the endless rotatable device.
Figure 8:
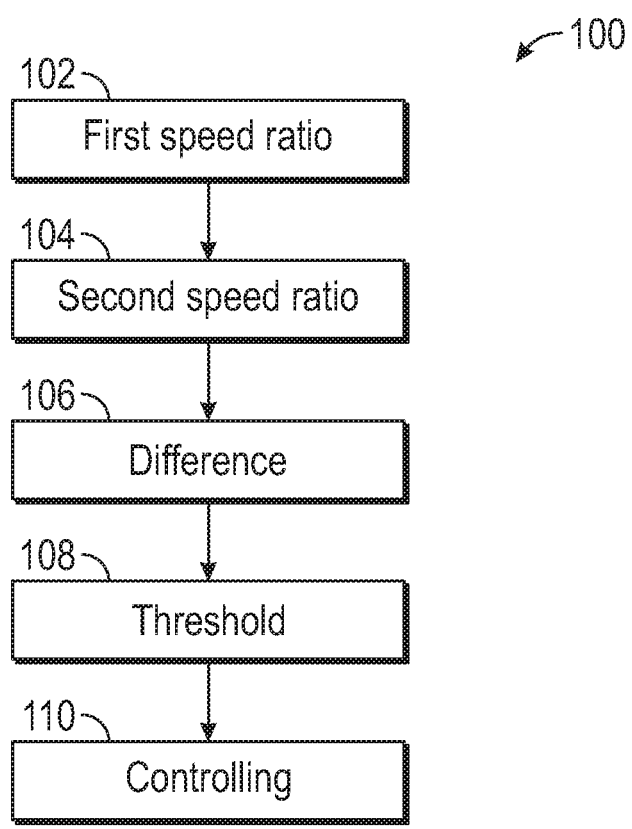
FIG. 8 is a flow chart describing a method for controlling the CVT shown in FIG. 2.

With reference to FIGS. 5-7, the rotary angle sensor 47 is coupled to the guide 43 and the pivot pin 45 to determine the angular position of the endless rotatable device 22. The angular position of the endless rotatable device 22 is expressed as a device angle θ (or chain angle) which is defined from the central axis 66 of the CVT 14 to the longitudinal center axis 31 of the endless rotatable device 22. The central axis 66 of the CVT 14 intersects the axis of rotation 11P of the primary pulley 18 (i.e., the drive pulley) and the axis of rotation 11S of the secondary pulley 20 (i.e., the driven pulley). The longitudinal center axis 31 extends along a connecting segment 68 (see FIG. 3) of the endless rotatable device 22 that is solely disposed between the primary pulley 18 (i.e., drive pulley) and the secondary pulley 20 (i.e., the driven pulley). As such, no portion of the connecting segment 68 is in direct contact with the primary pulley 18 (i.e., drive pulley) and the secondary pulley 20 (i.e., the driven pulley).

The controller 50 is programmed to determine (e.g., calculate) a first speed ratio of the CVT 14 as a function of the device angle θ, a primary radii $r_p$, and a secondary radii $r_s$. The primary radii $r_p$ is a distance from the axis of rotation 11P of the (drive pulley) to a location in which the endless rotatable device 22 is in direct contact with the drive pulley. The secondary radii $r_s$ is a distance from the axis of rotation 11S of the secondary pulley (i.e., the driven pulley) to a location in which the endless rotatable device 22 is in direct contact with the secondary pulley (i.e., driven pulley).

The first or primary speed sensor $S_P$ is coupled to the drive pulley 18. The second or secondary speed sensor $S_S$ may be connected to a pulley axle 62 of the driven pulley 20 (FIG. 2). As such, the first speed sensor $S_P$ is configured to measure the input speed ($\omega_P$) of the CVT 14. The second speed sensor $S_S$ is coupled to the secondary pulley 20 (i.e., driven pulley). As such, the second speed sensor $S_S$ is configured to measure the output speed ($\omega_P$) of the CVT 14. The controller 50 is programmed to calculate a second speed ratio of the CVT 14 by dividing the output speed ($\omega_P$) of the CVT 14 by the input speed ($\omega_P$) of the CVT 14. The controller 50 is programmed to subtract the second speed ratio from the first speed ratio to determine a difference between the first speed ratio and the second speed ratio. In addition, the controller 50 is programmed to determine if the difference between the first speed ratio and the second speed ratio is greater than a predetermined ratio threshold. If the difference between the first speed ratio and the second speed ratio is greater than a predetermined ratio threshold, the controller 50 is programmed to command an actuator (e.g., first and second pulley actuators 28 and 30) to adjust (e.g., increase) the clamping force ($F_C$) exerted on the primary pulley 18 (i.e., drive pulley) and/or the secondary pulley 20 (i.e., the driven pulley).

FIG. 5 is a flowchart of a method 100 for controlling the CVT 14. The controller 50 is specifically programmed to execute the method 100 to detect CVT slipping and increase the clamping pressure in the CVT is desirable to maximize the life of the CVT. The method 100 begins at step 102. At step 102, the controller 50 determines a first speed ratio based on an angular position (expressed as a measured device angle θ) of the endless rotatable device 22 of the CVT 14. As discussed above, the device angle θ can be measured with the rotary angle sensor 47. At step 102, the controller 50 determines (e.g., calculates) the first speed ratio of the CVT 14 as a function of the device angle θ, the primary radii $r_p$, and the secondary radii $r_s$. Then, the method 100 proceeds to step 104.

At step 104, the controller 50 determines (e.g., calculates) a second speed ratio based on an input speed and an output speed of the CVT 14. Specifically, the controller 50 divides the output speed ($\omega_P$) of the CVT 14 by the input speed ($\omega_P$) of the CVT 14 to determine the second speed ratio. Next, the method 100 continues to step 106.

At step 106, the controller 50 determines (e.g., calculates) the difference between the first speed ratio and the second speed ratio by subtracting the second speed ratio from the first speed ratio. Then, the method 100 continues to step 108.

At step 108, the controller 50 determines if the difference between the first speed ratio and the second speed ratio is greater than a predetermined ratio threshold. If the difference between the first speed ratio and the second speed ratio is greater than the predetermined ratio threshold, then the method 100 proceeds to step 110.

At step 110, the controller 50 commands the actuators 28 and/or 30 on the primary pulley 18 (i.e., drive pulley) and/or the secondary pulley 20 (i.e., driven pulley) based of the CVT 14 to adjust (i.e., increase) the clamping force (Fc) exerted on the drive pulley in response to determining the difference between the first speed ratio and the second speed ratio is greater than the predetermined ratio threshold in order to minimize CVT slipping.

While the best modes for carrying out the disclosure have been described in detail, those familiar with the art to which this disclosure relates will recognize various alternative designs and embodiments within the scope of the appended claims. Although the steps of the method 100 are described in a particular chronological order, it is contemplated that the steps of the method 100 may be executed in another chronological order.

The invention claimed is:

1. A continuously variable transmission (CVT) assembly, comprising:

a CVT including a drive pulley, a driven pulley, and an endless rotatable device coupled between the drive pulley and the driven pulley;

an actuator coupled to the drive pulley such that the actuator is configured to exert a clamping force on the drive pulley;

an angle sensor coupled to the endless rotatable device such that the angle sensor is configured to measure an angular position of the endless rotatable device; and a controller in communication with the actuator and the angle sensor, wherein the controller is programmed to:
   determine a speed ratio of the CVT based on the angular position of the endless rotatable device; and
   control the actuator to adjust the clamping force exerted on the drive pulley in response to determining the speed ratio of the CVT.

2. The CVT assembly of claim 1, further comprising a first speed sensor coupled to the drive pulley such that the first speed sensor is configured to measure an input speed of the CVT.

3. The CVT assembly of claim 2, further comprising a second speed sensor coupled to the driven pulley such that the second speed sensor is configured to measure an output speed of the CVT.

4. The CVT assembly of claim 3, wherein the speed ratio is a first speed ratio, and the controller is programmed to calculate a second speed ratio of the CVT as a function of the input speed of the CVT and the output speed of the CVT.

5. The CVT assembly of claim 4, wherein the controller is programmed to determine that a difference between the first speed ratio and the second speed ratio is greater than a predetermined ratio threshold.

6. The CVT assembly of claim 5, wherein the controller is programmed to command the actuator to increase the clamping force exerted on the drive pulley in response to determining that the difference between the first speed ratio and the second speed ratio is greater than the predetermined ratio threshold.

7. The CVT assembly of claim 6, wherein the angular position of the endless rotatable device is expressed as a device angle from a central axis of the CVT to a longitudinal center axis of the endless rotatable device.

8. The CVT assembly of claim 7, wherein the central axis of the CVT intersects an axis of rotation of the driven pulley and an axis of rotation of the drive pulley.

9. The CVT assembly of claim 8, wherein the longitudinal center axis extends along a connecting segment of the endless rotatable device that is solely disposed between the driven pulley and the drive pulley such that no portion of the connecting segment is in direct contact with the driven pulley and the drive pulley.

10. The CVT assembly of claim 9, further comprising a CVT case and a guide pivotally coupled to the CVT case, wherein the guide is directly coupled to the endless rotatable device to guide a movement of the endless rotatable device, and the angle sensor is directly coupled to the guide.

11. The CVT assembly of claim 1, wherein the angular position of the endless rotatable device is expressed as a device angle from a central axis of the CVT to a longitudinal center axis of the endless rotatable device, the central axis of the CVT intersects an axis of rotation of the driven pulley and an axis of rotation of the drive pulley, the longitudinal center axis extends along a connecting segment of the endless rotatable device that is solely disposed between the driven pulley and the drive pulley such that no portion of the connecting segment is in direct contact with the driven pulley and the drive pulley, the speed ratio is a first speed ratio, the controller is programmed to determine the first speed ratio of the CVT as a function of the device angle, a primary radii and a secondary radii, the primary radii is a distance from the axis of rotation of the driven pulley to a location in which the endless rotatable device is in direct contact with the driven pulley, the secondary radii is a distance from the axis of rotation of the drive pulley to a location in which the endless rotatable device is in direct contact with the drive pulley, and the endless rotatable device is a chain.

12. The CVT assembly of claim 11, further comprising a first speed sensor coupled to the drive pulley such that the first speed sensor is configured to measure an input speed of the CVT, the CVT assembly further includes a second speed sensor coupled to the driven pulley such that the second speed sensor is configured to measure an output speed of the CVT, the controller is programmed to calculate a second speed ratio of the CVT by dividing the output speed of the CVT by the input speed of the CVT, the controller is programmed to subtract the second speed ratio from the first speed ratio to determine a difference between the first speed ratio and the second speed ratio, the controller is programmed to determine that the difference between the first speed ratio and the second speed ratio is greater than a predetermined ratio threshold, and the controller is programmed to command the actuator to adjust the clamping force exerted on at least one of the drive pulley or the driven pulley in response to determining that the difference between the first speed ratio and the second speed ratio is greater than the predetermined ratio threshold.

13. The CVT assembly of claim 12, further comprising a CVT case and a guide pivotally coupled to the CVT case, wherein the guide is directly coupled to the endless rotatable device to guide a movement of the endless rotatable device, and angle sensor is directly coupled to the guide, the CVT assembly further includes a pivot pin directly interconnecting the CVT case and the guide, the guide includes a first guide portion and a second guide portion, the first guide portion is spaced apart from the second guide portion so as to define a guiding gap therebetween, the guiding gap movably receives the endless rotatable device, the guide further includes a guide coupling portion interconnecting the first guide portion and the second guide portion, the guide defines a guiding slot in the guide coupling portion, and the guiding slot movably receives the pivot pin to facilitate axial and pivotal movement of the guide relative to the CVT case.

14. A vehicle, comprising:
a power plant configured to generate input torque;
a CVT including a drive pulley, a driven pulley, and an endless rotatable device coupled between the drive pulley and the driven pulley, wherein the drive pulley is coupled to the power plant such that the drive pulley is configured to receive the input torque from the power plant;
an actuator coupled to the drive pulley such that the actuator is configured to exert a clamping force on the drive pulley;
an angle sensor coupled to the endless rotatable device such that the angle sensor is configured to measure an angular position of the endless rotatable device; and
a controller in communication with the actuator and the angle sensor, wherein the controller is programmed to:
determine a speed ratio of the CVT based on the angular position of the endless rotatable device; and
control the actuator to adjust the clamping force exerted on the drive pulley in response to determining the speed ratio of the CVT.

15. The vehicle of claim 14, further comprising a first speed sensor coupled to the drive pulley such that the first speed sensor is configured to measure an input speed of the CVT.

16. The vehicle of claim 15, further comprising a second speed sensor coupled to the driven pulley such that the second speed sensor is configured to measure an output speed of the CVT.

17. The vehicle of claim 16, wherein the speed ratio is a first speed ratio, and the controller is programmed to calculate a second speed ratio of the CVT as a function of the input speed of the CVT and the output speed of the CVT.

18. The vehicle of claim 17, wherein the controller is programmed to determine that a difference between the first speed ratio and the second speed ratio is greater than a predetermined ratio threshold.

19. The vehicle of claim 18, wherein the controller is programmed to command the actuator to increase the clamping force exerted on at least one of the drive pulley or the driven pulley in response to determining that the difference between the first speed ratio and the second speed ratio is greater than the predetermined ratio threshold.

20. A method for controlling a continuously variable transmission (CVT), comprising:
determining a first speed ratio based on an angular position of an endless rotatable device of the CVT;
determining a second speed ratio based on an input speed and an output speed of the CVT;
determining a difference between the first speed ratio and the second speed ratio;
determining that the difference between the first speed ratio and the second speed ratio is greater than a predetermined ratio threshold; and
controlling, by a controller, an actuator of the CVT to adjust a clamping force exerted on a drive pulley in response to determining the difference between the first speed ratio and the second speed ratio is greater than the predetermined ratio threshold.

* * * * *